(12) United States Patent
Tutzer et al.

(10) Patent No.: US 10,566,666 B2
(45) Date of Patent: Feb. 18, 2020

(54) COOLED BUSBARS AND PLATE

(71) Applicant: Thunder Power New Energy Vehicle Development Company Limited, Central (HK)

(72) Inventors: Peter Tutzer, Milan (IT); Francesco Mastrandrea, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/878,207

(22) Filed: Jan. 23, 2018

(65) Prior Publication Data

US 2018/0151923 A1 May 31, 2018

Related U.S. Application Data

(63) Continuation of application No. 15/675,437, filed on Aug. 11, 2017, now Pat. No. 9,882,253.

(60) Provisional application No. 62/384,298, filed on Sep. 7, 2016.

(51) Int. Cl.

| H01M 2/22 | (2006.01) |
|---|---|
| H01M 10/613 | (2014.01) |
| H01M 2/02 | (2006.01) |
| H01M 2/06 | (2006.01) |
| H01M 10/052 | (2010.01) |
| H01M 10/058 | (2010.01) |

(52) U.S. Cl.
CPC ....... H01M 10/613 (2015.04); H01M 2/0255 (2013.01); H01M 2/06 (2013.01); H01M 10/052 (2013.01); H01M 10/058 (2013.01); H01M 2220/20 (2013.01)

(58) Field of Classification Search
CPC ............ H01M 10/613; H01M 10/058; H01M 10/052; H01M 2/06; H01M 2/0255; H01M 2220/20; H01M 10/643; H01M 10/66; H01M 10/6556; H01M 10/6553; H01M 10/625; H01M 2/1072; H01M 2/26; H01M 10/6557
See application file for complete search history.

(56) References Cited

U.S. PATENT DOCUMENTS

2008/0220315 A1* 9/2008 Dougherty .......... H01M 2/1077
429/53

* cited by examiner

*Primary Examiner* — Cynthia K Walls (57) ABSTRACT

A rechargeable battery system, a battery pack, and methods of manufacturing the same are disclosed herein. The rechargeable battery system and/or battery pack can be for an electric vehicle. The rechargeable battery system and/or battery pack can include a plurality of battery cells arranged into one or more rows, a busbar, and a housing. The busbar can extend over the ends of the plurality of battery cells, and can be configured to conduct electrical energy to and from the battery cells. The busbar may also connect to the one or more of the terminals of the plurality of battery cells. The busbar may define a busbar cooling duct having an entrance and an exit. In addition, the busbar cooling duct may be in thermal connection with a plurality of contacts of the busbar.

10 Claims, 7 Drawing Sheets

COOLED BUSBARS AND PLATE

CROSS-REFERENCES TO RELATED APPLICATIONS

The present application is a continuation of U.S. Nonprovisional application Ser. No. 15/675,437, filed Aug. 11, 2017, which is a nonprovisional of and claims priority to U.S. Provisional Application No. 62/384,298, filed Sep. 7, 2016, the entire contents of each of which are hereby incorporated by reference for all purposes.

BACKGROUND

An electric vehicle uses one or more electric motors powered by electrical energy stored in a rechargeable battery pack. Lithium-based batteries are often chosen for their high power and energy density. In order to ensure that an electric vehicle operates efficiently and safely, the temperature of the battery pack must be maintained within a defined range of optimal temperatures. The coolant system of electric vehicle can be physically extended to the battery pack to remove excess heat, thereby increasing the service life of the battery pack and increasing the distance that can be traveled on a single charge.

As the popularity of electric vehicles increases, efficiency in the manufacturing process will become more important. Processes and devices that decrease the cost of manufacturing battery packs while simultaneously increasing their reliability and safety will be key to meeting customer demands. Specifically, there is a need for processes and devices that ensure reliable electrical connections between individual battery cells, that efficiently cool the battery pack, and that aid in the manufacturing process of assembling the thousands of individual battery cells into modular packs that can be installed and replaced when necessary.

BRIEF SUMMARY OF THE INVENTION

Aspects of the present disclosure relate to battery packs and methods of making and/or manufacturing the battery packs, and some aspects of the present disclosure relate to housing for receiving one or several battery and/or battery cells, and specifically to housings containing an integral cooling duct.

One aspect of the present disclosure relates to a battery pack for an electric vehicle. The battery pack can include a plurality of battery cells arranged into one or more rows. In some embodiments, each of the plurality of battery cells can include a first terminal and a second terminal; each of the plurality of battery cells comprises a first end and a second end. The battery pack can include a busbar extending over the first ends of the plurality of battery cells, the busbar can conduct electrical energy to and from at least the subset of battery cells, and the busbar connecting to the first terminals and the second terminals of the plurality of battery cells. In some embodiments, the busbar defines a busbar cooling duct having an entrance and an exit. In some embodiments, the busbar cooling duct is in thermal connection with a plurality of contacts of the busbar. The battery pack can include a housing including a plurality of receptacles that can engage with the plurality of battery cells to secure a relative position of the plurality of battery cells with respect to each other. In some embodiments, the housing defines a cooling duct in thermal connection with the plurality of receptacles.

In some embodiments, the busbar can include a first busbar layer that can conduct electrical energy to and from a first subset of battery cells and a second busbar layer that can conduct electrical energy to and from a second subset of battery cells. In some embodiments, the first layer is electrically insulated from the second busbar. In some embodiments, the busbar includes a top and a bottom. The busbar cooling duct can include a top and a bottom. In some embodiments, the busbar cooling duct includes a first cooling duct directly cooping the first busbar layer and a second cooling duct directly cooling the second busbar layer. In some embodiments, the busbar and the housing can simultaneously cool the first and second terminals of the battery cells in the battery packet.

In some embodiments, the first busbar layer can alternatingly connect to the first and second terminals of battery cells. In some embodiments, the first busbar layer can include a first conductive material, and the second busbar includes a second conductive material. In some embodiments, the first busbar layer is separated from the second busbar layer by an insulative layer. In some embodiments, the first and second materials are the same material.

In some embodiments, the housing includes an entrance and an exit fluidly connected to the housing cooling duct. In some embodiments, the battery pack further includes a heat exchanger fluidly connected to at least one of the entrance and the exit of the housing cooling duct. In some embodiments, the battery pack further includes a cooling fluid contained within the heat exchanger, the busbar cooling duct, and the housing cooling duct.

One aspect of the present disclosure relates to a method of manufacturing a battery pack for an electric vehicle. The method includes arranging a plurality of battery cells into one or more rows. In some embodiments, each of the plurality of battery cells includes a first terminal and a second terminal; and each of the plurality of battery cells includes a first end and a second end. In some embodiments, the method includes positioning a busbar that can conduct electrical energy to and from plurality battery cells over the first ends of the plurality of battery cells. In some embodiments, the busbar defines a busbar cooling duct thermally connected with a plurality of contacts of the busbar. The method includes receiving the plurality of battery cells within a plurality of receptacles of a housing. In some embodiments, the receptacles can engage with the plurality of battery cells to secure a relative position of the plurality of battery cells with respect to each other. In some embodiments, the housing defines a housing cooling duct in thermal connection with the plurality of receptacles.

In some embodiments, the busbar can include a first busbar layer that can conduct electrical energy to and from a first subset of battery cells and a second busbar layer that can conduct electrical energy to and from a second subset of battery cells. In some embodiments, the first busbar layer is electrically insulated from the second busbar layer. In some embodiments, the busbar includes a top and a bottom, and the busbar cooling duct includes a first cooling duct directly cooling the first busbar layer and a second cooling duct directly cooling the second busbar layer.

In some embodiments, the busbar and the housing can simultaneously cool the first and second terminals of the battery cells in the battery pack. In some embodiments, the housing includes an entrance and an exit fluidly connected to the housing cooling duct. In some embodiments, the method includes fluidly connecting the entrance and exit of the housing cooling duct to a heat exchanger. In some embodiments, he battery pack further includes a heat exchanger fluidly connected to at least one of the entrance and the exit of the housing cooling duct. In some embodiments, the heat exchanger is fluidly connected to at least one of the entrance and the exit of the busbar cooling duct. In some embodiments, the method includes filing the heat exchanger, the busbar cooling duct, and the housing cooling duct with a cooling fluid. In some embodiments, the cooling fluid includes a refrigerant.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Described herein are embodiments for providing a battery pack comprising a combined integrated busbar and cooling plate system. The battery pack can include a busbar having an integral busbar cooling duct. The integral busbar can be positioned over first ends of the battery cells in the battery pack and can be electrically connected to positive and negative terminals of the battery cells. The cooling plate system can connect to second ends of the battery cells in the battery pack. Both the integral busbar and the cooling place system can include cooling ducts that define a volume through which a cooling fluid such as, for example, a refrigerant can flow. The cooling fluid can be liquid, gaseous, or a combination of liquid and gaseous.

In some embodiments, the busbar and/or the cooling plate system can be fluidly connect to a cooling system that can include, for example, a heat exchanger. In some embodiments, the cooling system and/or the heat exchanger can be a part of the battery pack and/or can be separate from the battery pack.

Figure 1:
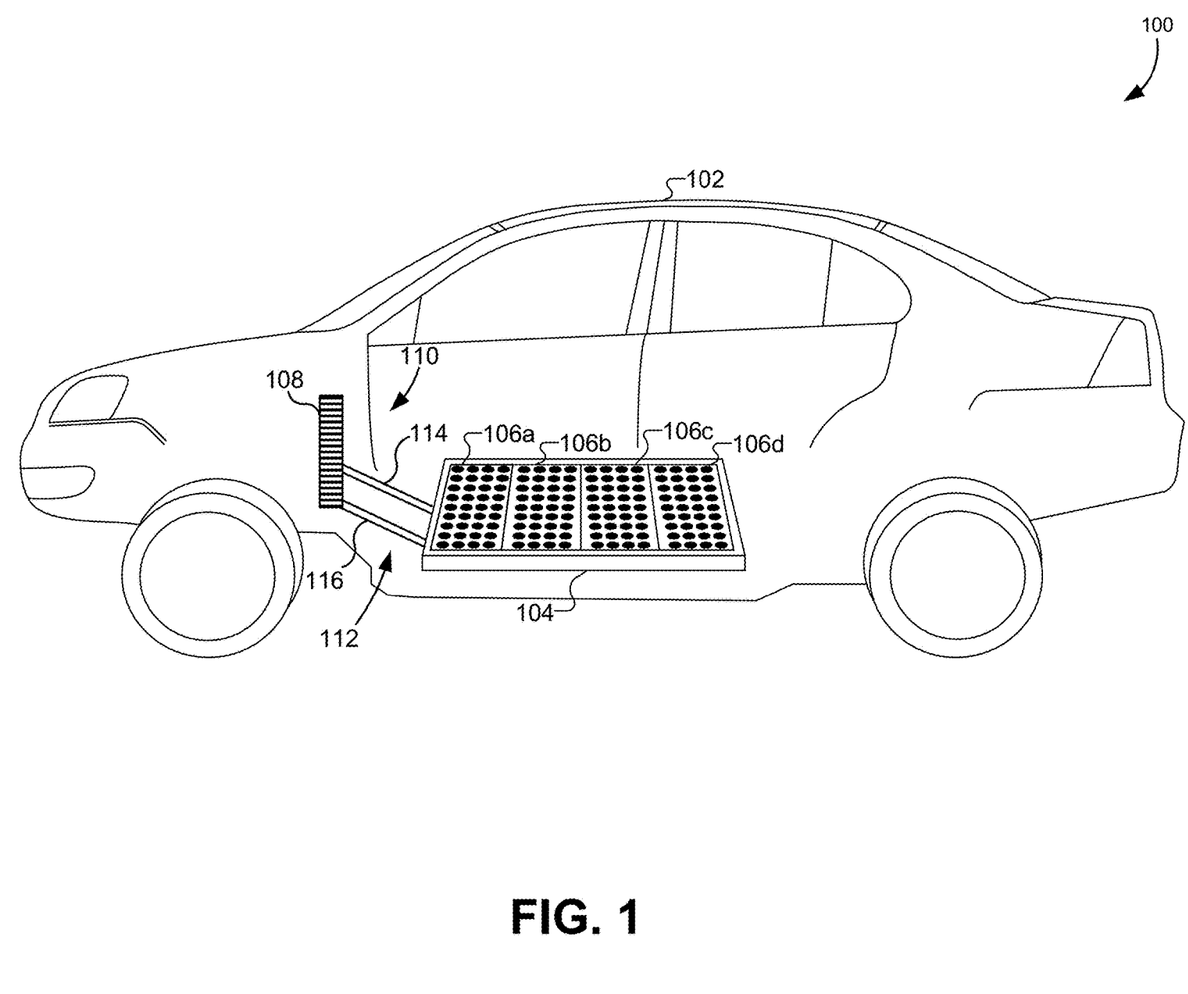
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery packs 106. A battery pack may be comprised of a plurality of individual battery cells that are electrically connected to provide a particular voltage/current to the electric vehicle 102. In some embodiments, the battery cells forming the battery pack can be arranged in one or several rows of battery cells. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form a single battery pack 106a, and the rechargeable battery system 104 may include four battery packs 106, eight battery packs, ten battery packs, sixteen battery packs, and/or the like, connected in parallel or series until the electrical requirements of the electric vehicle 102 are satisfied. The individual battery cells included in each battery pack 106 may total in the thousands for a single electric vehicle 102.

In some embodiments, the rechargeable battery system 104, and specifically one or several of the battery packs 106 can be connected to a heat exchanger 108 that can be a part of a cooling system 110. In some embodiments, the cooling system 110 can be part of the rechargeable battery system 104 and in some embodiments, the cooling system 110 can be separate from the rechargeable battery system 104. The cooling system 110 can include connecting lines 112 that can fluidly connect the heat exchanger 108 to one or several of the battery packs 106. The connecting lines 112 can include an inlet line 114 and an outlet line 116. The inlet line 114 can transport a cooling fluid, such as a refrigerant to the rechargeable battery system 104 and/or to one or several battery packs 106. In some embodiments, the cooling fluid can be contained in the cooling system 110, in the rechargeable battery system 104, and/or in one or several battery packs 106.

Figure 2:
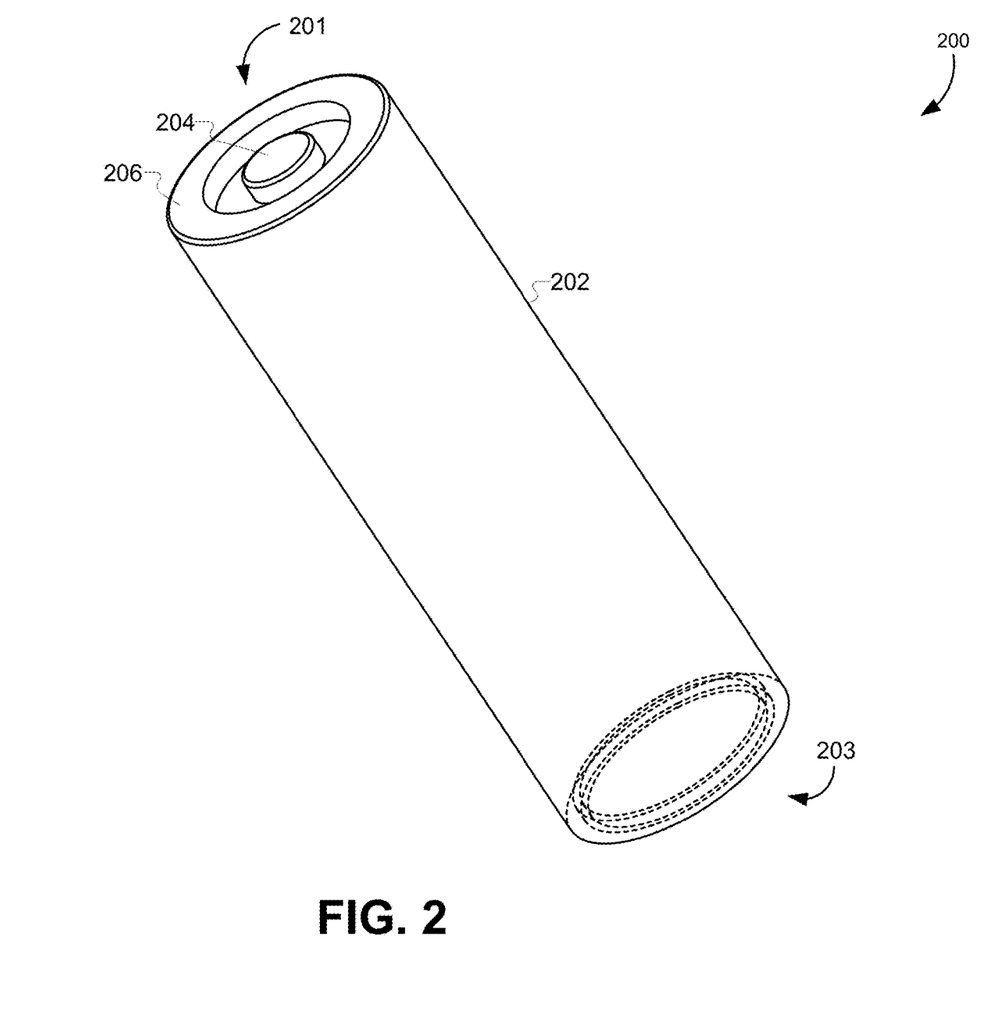
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g. The battery 202 includes a first end 201, also referred to herein as the top, and a second end 203, also referred to herein as the bottom, and may have at least two terminals. In some embodiments, a positive terminal 204 may be located at the top of the battery 202, and a negative terminal 206 may be located on the opposite bottom side of the battery 202.

In some embodiments, some or all of the battery cells forming a battery pack 106 can be oriented in the same direction. In other words, the positive terminal of each of the individual battery cells faces in an upward direction relative to the battery pack, and each of the negative terminals faces in a downward direction. In other embodiments, this need not be the case. Alternating rows of individual battery cells may be oriented in opposite direction such that the positive terminal of a first row is oriented in the up direction and the positive terminal of a second row is oriented in the downward direction. The orientation pattern for individual battery cells may vary without limitation. For example, every other battery cell in a row be oriented in opposite directions. In some embodiments, one half of the battery pack may have battery cells oriented in one direction, while the other half of the battery pack has cells oriented in the opposite direction. In any of these cases, connections may need to be established between batteries oriented in opposite directions or between batteries oriented in the same direction.

In order to make electrical connections between battery cells, a busbar may be used. As used herein, the term "busbar" refers to any metallic conductor that is connected to a plurality of individual battery cell terminals in order to transmit power from the individual battery cells to the electrical system of the electric vehicle. In some embodiments, the busbar may comprise a flat metallic sheet that is positioned on the top or the bottom of the battery pack. In some embodiments, the metallic sheet may cover an entire top or bottom of the battery pack, while in other embodiments, the busbar may comprise a strip that is longer than it is wide to interface with a single row of battery cells.

Figure 3:
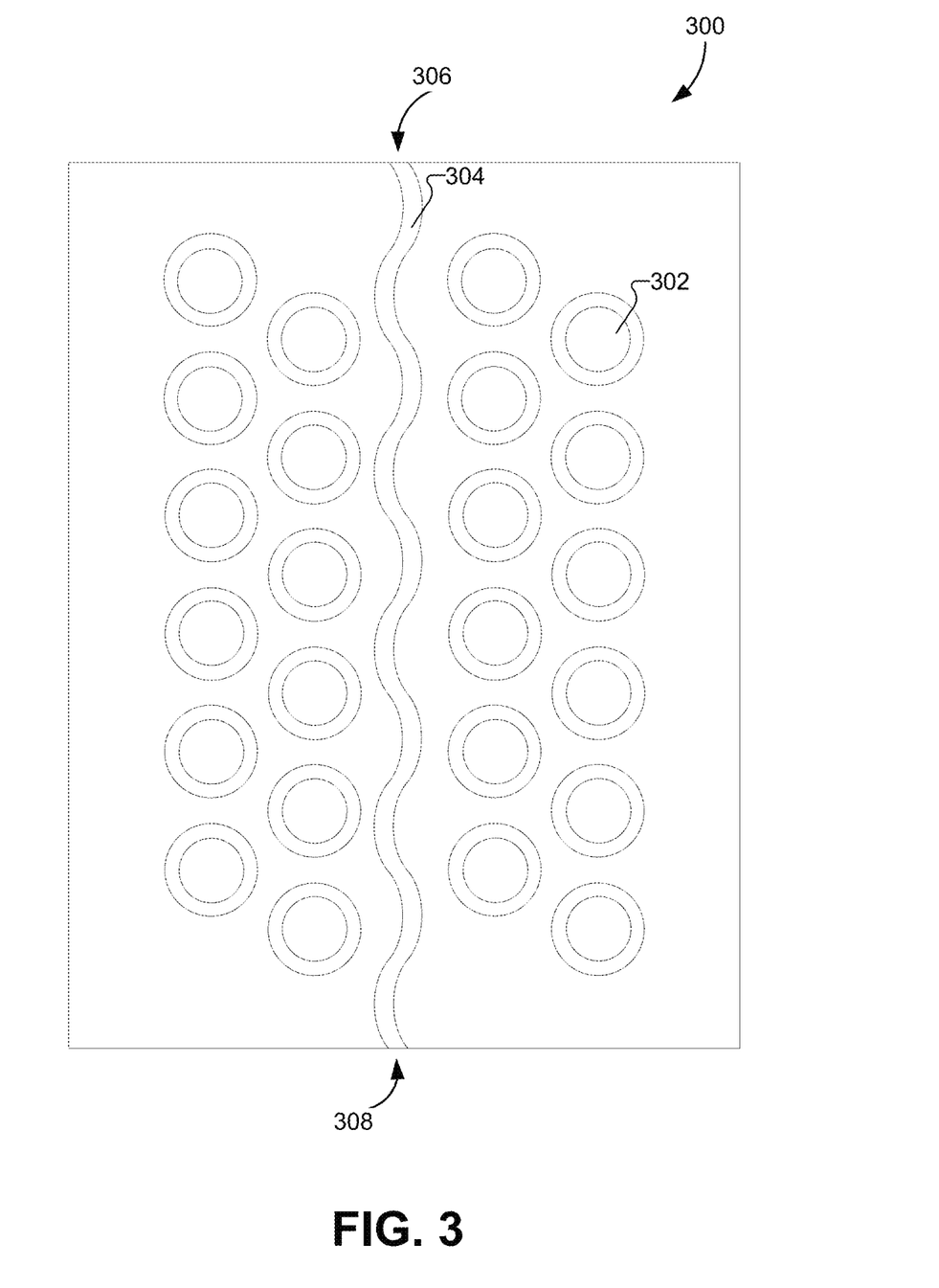
FIG. 3 is a top view of one embodiment of a busbar.

FIG. 3 is a top-view of one embodiment of an exemplary busbar 300. The busbar 300 can comprise a variety of shapes and sizes and can be made from a variety of materials. In some embodiments, the busbar 300 can be made from one or several materials that can be arranged in one or several layers. In some embodiments, one or several of these layers and/or one or several of the plurality of materials can be conductive.

The busbar 300 can include a plurality of contacts 302. The plurality of contacts 302 can be configured to electrically connect one or several portions and/or layers of the busbar 300 with one or several battery cells, and specifically to the terminals of one or several battery cells. In some embodiments, one or several of the plurality of contacts 302 can be electrically connected with one or several conductive layers of the busbar 300 and/or with one or several conductive materials forming the busbar 300. In some embodiments, some or all of the contacts 302 can be recessed into the busbar 300 to receive a portion of the battery cell with which the contact 302 electrically connects.

The busbar 300 can further include a busbar cooling duct 304. The busbar cooling duct 304 can define a volume that can contain all or portions of the cooling fluid including the refrigerant. Thus, in some embodiments, the cooling fluid and/or refrigerant can be contained with the cooling system 110 which can include the heat exchanger 108, and/or the busbar cooling duct 304. The busbar cooling duct 304 can be in thermal connection with all or portions of the busbar 300 including, for example some or all of the plurality of contacts forming the busbar 300.

The busbar cooling duct 304 can include an inlet 306, also referred to herein as an entrance 306, and an outlet 308, also referred to herein as an exit 308. The busbar cooling duct 304 can fluidly connect the inlet 306 and the outlet 308 such that the cooling fluid can flow into the busbar cooling duct 304 via the inlet 306 and can flow out of the busbar cooling duct 304 via the outlet 308.

The busbar cooling duct 304 can comprise a variety of shapes and sizes. In some embodiments, the size and/or shape of the busbar cooling duct 304 can be selected based on the cooling desired for the busbar 300. Thus, in embodiments in which greater cooling is desired, the busbar 300 can be sized and/or shaped to allow the through-flow of greater volumes of cooling fluid and/or can be sized and/or shaped to transport cooling fluid proximate to greater portions of the busbar 300. In some embodiments, the busbar cooling duct 304 can linearly extend from the entrance 306 to the exit 308, and in some embodiments, the busbar cooling duct 304 can non-linearly extend from the entrance 306 to the exit 308. In some embodiments, for example, the busbar cooling duct 304 can be serpentine and/or serpentine shaped between the entrance 306 and the exit 308 as is depicted in FIG. 3.

Figure 4:
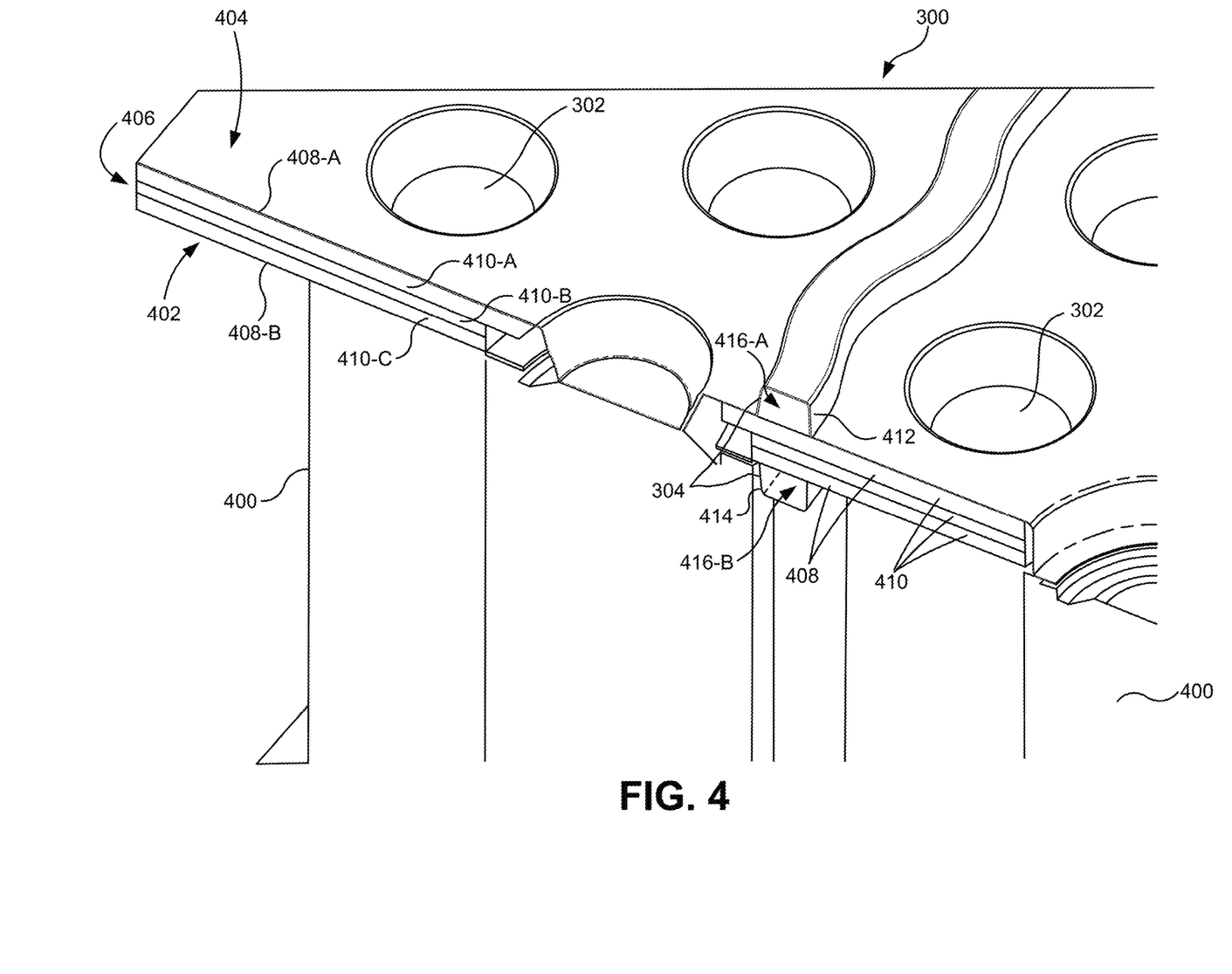
FIG. 4 is a perspective section view of one embodiment of a busbar connecting to a plurality of battery cells.

FIG. 4 is a perspective section view of one embodiment of a busbar 300 connecting to a plurality of battery cells 400 that can be, for example, lithium-based batteries 202. As seen in FIG. 4, the battery cells 400 connect to the busbar 300 at contacts 302 such that the battery cells 400 are electrically connected with all or portions of the busbar 300.

The busbar 300 comprises a bottom 402 and a top 404. As seen in FIG. 4, the busbar cooling duct 304 can be located along one or both of the bottom 402 and the top 404 of the busbar 300.

The busbar 300 can further comprise a plurality of layers 406. These layers 406 can include, for example, outer layers 408 including a top-outer layer 408-A and a bottom-outer layer 408-B, and intermediate layers 410 including a top-intermediate layer 410-A, a middle-intermediate layer 410-B, and a bottom-intermediate layer 410-C. In some embodiments, one or more of the intermediate layers 410 such as, for example, the top-intermediate layer 410-A and/or the bottom-intermediate layer 410-C can be conducted and/or be made of a conductive material.

In some embodiments, for example, each of the top-intermediate layer 410-A and the bottom-intermediate layer 410-C can be electrically conductive and the middle-intermediate layer 410-B can be an insulator between the top-intermediate layer 410-A and the bottom-intermediate layer 410-C to prevent electrical current from passing from one of the top-intermediate layer 410-A and the bottom-intermediate layer 410-C to the other of the top-intermediate layer 410-A and the bottom-intermediate layer 410-C. In some embodiments, the top-intermediate layer 410-A can be configured to conduct electrical energy to and/or from a first subset of battery cells, and the bottom-intermediate layer 410-C can be configured to conduct electrical energy to and/or from a second subset of battery cells. In some embodiments, the top-intermediate layer 410-A can be connected to one of: the first terminals 204 of the battery cells 400 or to the second terminals 206 of the battery cells 400, and the bottom-intermediate layer 410-C can be connected to the other of the first terminals 204 of the battery cells 400 or to the second terminals 206 of the battery cells 400 such that the battery cells 400 are connected in parallel. Alternatively, in some embodiments, the top-intermediate layer 410-A can be alternatingly connected to one or several of the first terminals 204 of the battery cells 400 and to one or several of the second terminals 206 of the battery cells 400, and the bottom-intermediate layer 410-C can be alternatingly connected to one or several of the second terminals 206 of the battery cells 400 and to one or several the of the first terminals 204 of the battery cells 400 such that the battery cells 400 are connected in series.

In some embodiments, the busbar cooling duct 304 can be located between and/or formed or defined by two or more of the plurality of layers 406 of the busbar 300. Specifically, and as shown in FIG. 4, the busbar cooling duct 304 can be located between and formed or defined by one or both of the outer layers 408 and one or more of the intermediate layers 410. In some embodiments, for example, the busbar cooling duct 304 can comprise a first cooling duct 412 located along the top 404 of the busbar 300 and a second cooling duct 414 located along the bottom 402 of the busbar 300. As further depicted in FIG. 4, the first cooling duct 412 is located between and formed or defined by the top-outer layer 408-A and the top-intermediate layer 410-A and the second cooling duct 414 is located between and formed or defined by the bottom-outer layer 408-B and the bottom-intermediate layer 410-C. In some embodiments, the first cooling duct 412 can thus provide direct cooling to the top-outer layer 408-A and the top-intermediate layer 410-A and the second cooling duct 414 can provide direct cooling to the bottom-outer layer 408-B and the bottom-intermediate layer 410-C.

Figure 5:
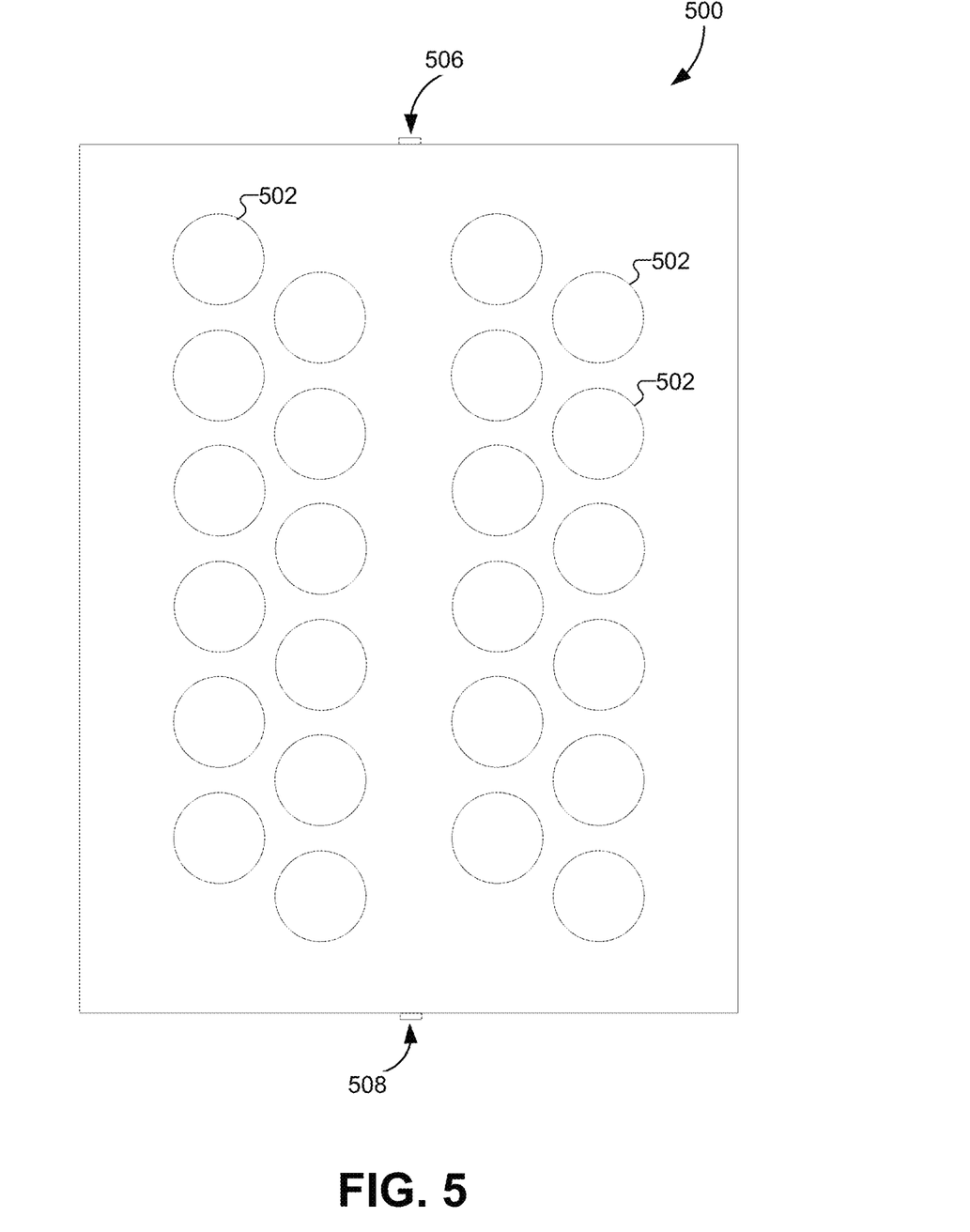
FIG. 5 is a top view of one embodiment of a bottom tray.

FIG. 5 is a top-view of one embodiment of an exemplary bottom tray 500, also referred to herein as a bottom carrier 500, a bottom cell holder 500, or a housing 500. The bottom tray 500 can comprise a variety of shapes and sizes and can be made from a variety of materials. In some embodiments, the bottom tray 500 can be made from one or several corrosion resistant materials that can have one or several desired heat transfer properties. In some embodiments, the bottom tray 500 can be made from a material that is electrically conductive, and in some embodiments, the bottom tray 500 can be made from a material that is electrically non-conductive.

The bottom tray 500 can include a plurality of receptacles 502. The plurality of receptacles 502 can comprise a variety of shapes and sizes. In some embodiments, the plurality of receptacles 502 can each comprise a cup or can be cup shaped. In some embodiments, each of the plurality of receptacles 502 can define a volume that can be, for example, cylindrical such as, circular cylindrical, rectangular cylindrical, triangular cylindrical, or the like.

The plurality of receptacles 502 can be configured to receive and hold a portion a battery cell such as the lithium battery 202. Thus, in some embodiments in which the receptacles are configured to receive and hold the lithium battery 202, the receptacles 502 can sized and shaped to securely receive one of the sides of the battery 202 such as, for example, a bottom 203 of the battery 202 or a top 201 of the battery. In some embodiments, the receptacles 502 can be configured to engage with the plurality of battery cells to secure a relative position of the plurality of battery cells with respect to each other. In some embodiments, the receptacles 502 can be sized so as to contact portions of the battery cell such as the lithium battery 202 when the battery cell is received with in the receptacle to facilitate heat transfer from the battery cell to the bottom tray 500.

The bottom tray 500 can include an inlet 506, also referred to herein as an entrance 506, and an outlet 508, also referred to herein as an exit 508. The bottom tray 500 can include one or several interior channels, also referred to herein as one or several fluidic ducts or cooling ducts, that can fluidly connect the inlet 506 and the outlet 508 such that the cooling fluid can flow into the bottom tray 500 via the inlet 506 and can flow out of the bottom tray 500 via the outlet 508.

The one or several interior channels within the bottom tray 500 can comprise a variety of shapes and sizes. In some embodiments, the one or several cooling ducts can be in thermal connection with the plurality of receptacles. In some embodiments, the size and/or shape of the cooling duct can be selected based on the cooling desired for the bottom tray 500. Thus, in embodiments in which greater cooling is desired, the cooling duct can be sized and/or shaped to allow the through-flow of greater volumes of cooling fluid and/or can be sized and/or shaped to transport cooling fluid proximate to greater portions of the bottom tray 500. In some embodiments, the cooling duct can linearly extend from the entrance 506 to the exit 508, and in some embodiments, the cooling duct can non-linearly extend from the entrance 506 to the exit 508.

Figure 6:
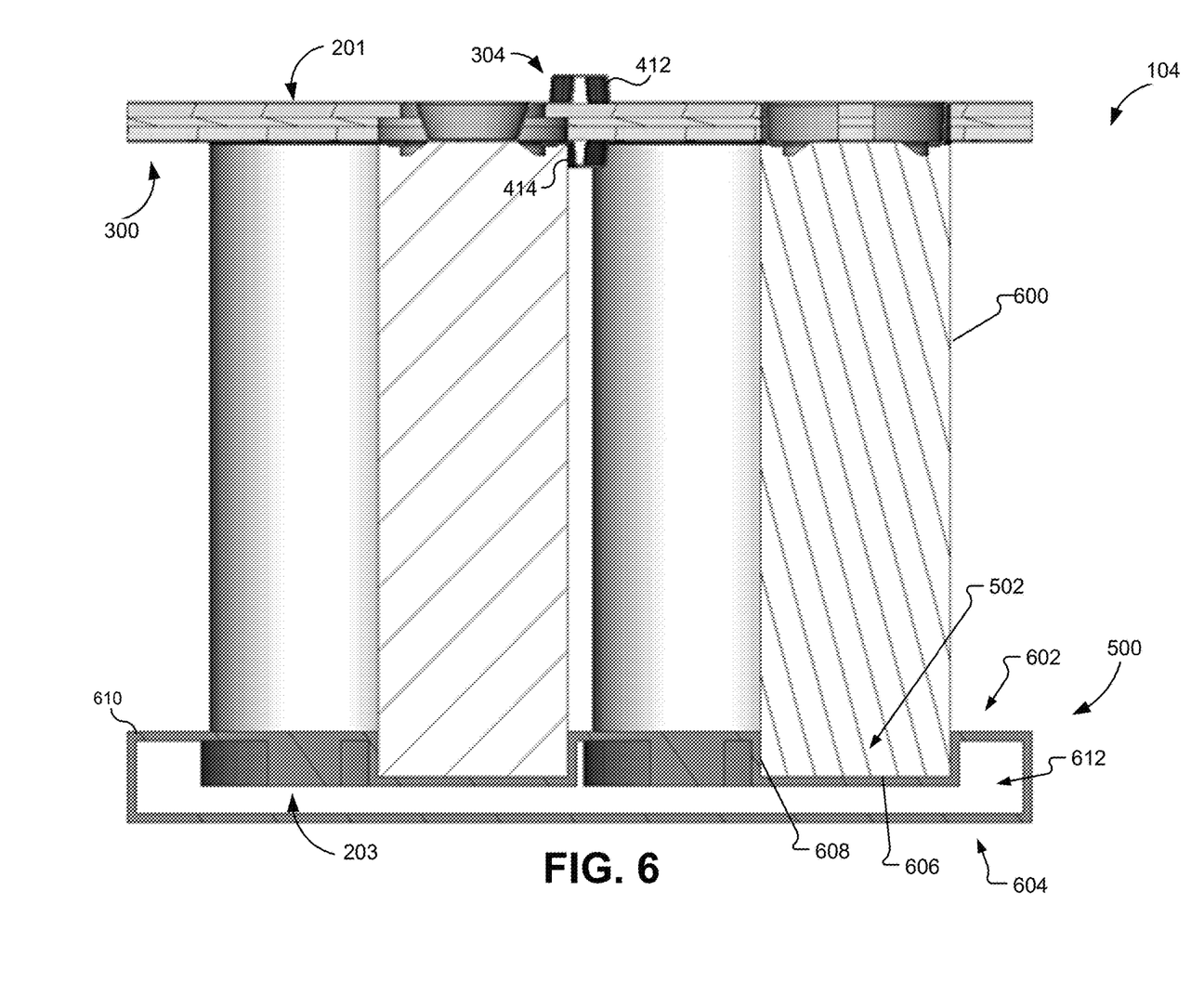
FIG. 6 is a section view of one embodiment of part of a rechargeable battery system including a bottom tray.

FIG. 6 is a perspective section view of one embodiment of the rechargeable battery system 104 including the bottom tray 500 holding a plurality of battery cells 600 that can be, for example, lithium-based batteries 202. The battery tray 500 has a top 602 and a bottom 604. As seen in FIG. 6, the receptacles 502 can be located in the top 602 of the bottom tray 500 and can extend towards the bottom 604 of the battery tray 500. As further seen in FIG. 6, the receptacles can comprise a bottom 606 and a wall 608 that can be, in some embodiments, a circumferential wall 608. In some embodiments, and as seen in FIG. 6, a portion of the battery cells 600 extends into the receptacle 502 and abuts the bottom 606 and the wall 608 of the receptacle 502.

As seen in FIG. 6, the bottom tray 500 includes the cooling duct 610 that can define a volume 612. The volume 612 and/or the cooling duct 610 can extend from the entrance 506 to the exit 508 of the bottom tray 500. In some embodiments, the cooling duct 610 and/or the volume 612 can extend wholly or partially around some or all of the receptacles 502.

In some embodiments, the volume 612 can contain all or portions of the cooling fluid including the refrigerant. Thus, in some embodiments, the cooling fluid and/or refrigerant can be contained with the cooling system 110 which can include the heat exchanger 108, and/or the cooling duct 610 and/or the internal volume 612. In some embodiments, the cooling duct 610 and/or the volume 612 can sized, shaped, and/or configured to maintain a desired temperature, heat exchange, and/or cooling across all or portions of the bottom tray 500.

In some embodiments, the one or several battery cells 600 can additionally contact a busbar 300. In some embodiments, the busbar 300 can contact the one or several battery cells 600 at another portion of the battery cells 600 than contacted by the bottom tray 500. In some embodiments, the busbar 300 can be electrically conductive and can connect some or all of the terminals of the battery cells 600. Specifically, as seen in FIG. 6, the busbar 300 can extend over the top 201 of the battery cells 600 and the bottom tray 500 can extend across the bottom 203 of the battery cells 600. In such an embodiment, the busbar 300 can conduct electrical energy to an from the battery cells, and can specifically connect to some or all of the first terminals 204 of the battery cells 600 and/or to some or all of the second terminals 206 of the battery cells 600.

As seen in FIG. 6, the busbar 300 can include the busbar cooling duct 304 that can include the first cooling duct 412 and second cooling duct 414. In some embodiments, the busbar cooling duct 304 can, via the connection of the battery cells 600 to the busbar 300 cool the battery cells 600, and specifically can cool the tops 201 of the battery cells 600. In some embodiments, the housing 500 can, via the connection of the battery cells 600 to the housing 500, cool the battery cells 600, and specifically cool the bottoms 203 of the battery cells 600. Thus, in some embodiments, the battery cells 600 can be simultaneously cooled by the busbar 300 and the housing 500.

Figure 7:
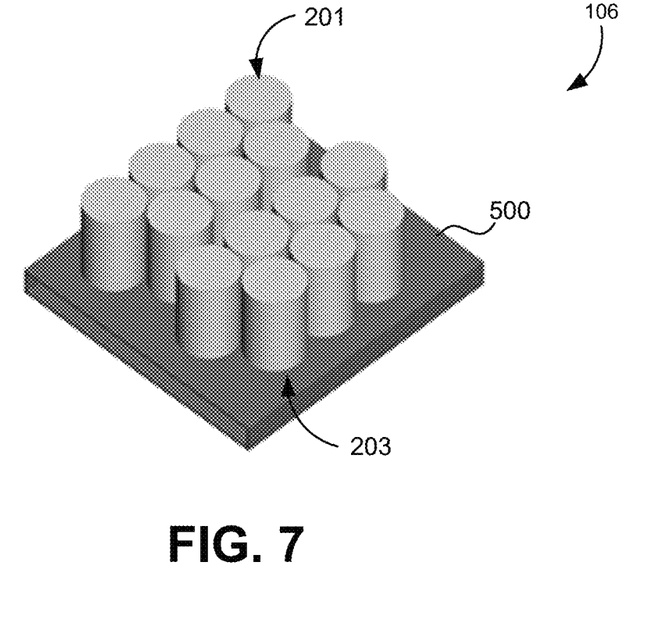
FIGS. 7 and 8 depict one embodiment of a process for manufacturing a battery pack for an electric vehicle.
Figure 8:
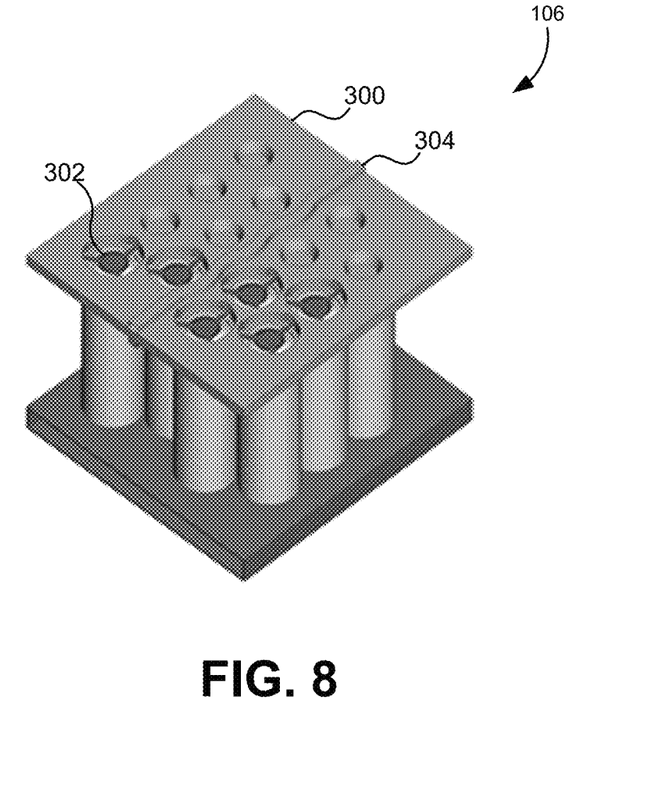

FIGS. 7 and 8 depict one embodiment of a process for manufacturing a battery pack 106 for an electric vehicle. As depicted in FIG. 7, the method includes arranging a plurality of battery cells into one or more rows. The second ends 203 of the battery are placed into receptacles 502 of the housing 500, and in some embodiments, are received within the receptacles 502 of the housing such that the second end 203 of each battery cell 400 is received within a receptacle 502 of the housing 500. In some embodiments, this containment of second end 203 of the battery cells 400 within the receptacles 502 of the housing 500 can secure a relative position of the battery cells 400 with respect to each other.

The method further includes positioning a busbar 300 over the first ends 201 of the battery cells 400. The busbar 300 can be positioned so that the contacts 302 of the busbar 300 are in electrical connection with some or all of the first and second terminals 204, 206 of the battery cells 300 in the battery pack 106. The method can further include fluiding connecting the entrance 506 and exit 508 of the housing 500 and/or the cooling duct 610 of the housing 500 to the heat exchanger 108 of the cooling system 110 via the connecting lines 112, and/or connecting the entrance 306 and exit 308 of the busbar cooling duct 304 to the heat exchanger 108 of the cooling system 110 via the connecting lines 112. The method can further include filling the cooling system 110, the heat exchanger 108, the cooling lines 112, the cooling duct 304 of the busbar 300, and/or the housing 500 of cooling duct 610 of the housing 500 with coolant such as a refrigerant, and circulating that coolant to maintain a desired temperature.

It should be appreciated that the specific steps illustrated in FIG. 5 provide particular methods of providing a rechargeable battery system and/or a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery pack for an electric vehicle, the battery pack comprising:
   a plurality of battery cells arranged into one or more rows, wherein:
      each of the plurality of battery cells comprises a first terminal and a second terminal; and
      each of the plurality of battery cells comprises a first end and a second end;
   a busbar extending over the first ends of the plurality of battery cells, the busbar configured to conduct electrical energy to and from the battery cells, wherein the busbar connects to one or more of the first and second terminals of the plurality of battery cells, wherein the busbar defines a busbar cooling duct having an entrance and an exit, wherein the busbar cooling duct is in thermal connection with a plurality of contacts of the busbar.

2. The battery pack of claim 1, wherein the busbar comprises a first busbar layer configured to conduct electrical energy to and from a first subset of battery cells and a second busbar layer configured to conduct electrical energy to and from a second subset of battery cells, and wherein the first busbar layer is electrically insulated from the second busbar layer.

3. The battery pack of claim 2, wherein the busbar comprises a top and a bottom, and wherein the busbar cooling duct comprises a first cooling duct directly cooling the first busbar layer and a second cooling duct directly cooling the second busbar layer.

4. The battery pack of claim 3, wherein the busbar is configured to simultaneously cool the first and second terminals of the battery cells in the battery pack.

5. The battery pack of claim 2, wherein the first busbar layer is configured to alternatively connect to the first and second terminals of battery cells.

6. The battery pack of claim 2, wherein the first busbar layer comprises a first conductive material and wherein the second busbar layer comprises a second conductive material.

7. The battery pack of claim 4, wherein the first busbar layer is separated from the second busbar layer by an insulative layer.

8. The battery pack of claim 6, wherein the first and second conductive materials are the same material.

9. The battery pack of claim 1, wherein the battery pack further comprises a heat exchanger fluidly connected to at least one of the entrance and the exit of the busbar cooling duct.

10. The battery pack of claim 9, further comprising a cooling fluid contained within the heat exchanger and the busbar cooling duct.

* * * * *